United States Patent
Seow et al.

(10) Patent No.: US 10,037,599 B2
(45) Date of Patent: Jul. 31, 2018

(54) AUTOMATIC GAIN CONTROL FILTER IN A VIDEO ANALYSIS SYSTEM

(71) Applicant: Omni AI, Inc., Dallas, TX (US)

(72) Inventors: Ming-Jung Seow, Houston, TX (US); Tao Yang, Katy, TX (US); Wesley Kenneth Cobb, The Woodlands, TX (US)

(73) Assignee: Omni AI, Inc., Houston, TX (US)

( * ) Notice: Subject to any disclaimer, the term of this patent is extended or adjusted under 35 U.S.C. 154(b) by 0 days.

(21) Appl. No.: 15/132,670

(22) Filed: Apr. 19, 2016

(65) Prior Publication Data

US 2016/0232652 A1 Aug. 11, 2016

Related U.S. Application Data

(63) Continuation of application No. 13/930,222, filed on Jun. 28, 2013, now Pat. No. 9,317,908.

(60) Provisional application No. 61/666,426, filed on Jun. 29, 2012.

(51) Int. Cl.
| | |
|---|---|
| *G06K 9/00* | (2006.01) |
| *G06T 5/00* | (2006.01) |
| *G06K 9/62* | (2006.01) |
| *G06T 7/10* | (2017.01) |
| *G06T 7/246* | (2017.01) |
| *G06T 7/194* | (2017.01) |

(52) U.S. Cl.
CPC ............ *G06T 5/009* (2013.01); *G06K 9/6218* (2013.01); *G06K 9/6267* (2013.01); *G06T 5/008* (2013.01); *G06T 7/10* (2017.01); *G06T 7/194* (2017.01); *G06T 7/251* (2017.01); *G06T 2207/10016* (2013.01); *G06T 2207/10024* (2013.01); *G06T 2207/20081* (2013.01); *G06T 2207/20208* (2013.01)

(58) Field of Classification Search
CPC . G06T 2207/10016; G06T 2207/20224; G06T 2207/20076; G06T 7/194; G06T 7/11; G06T 2210/12; G06K 9/622; H04N 21/2743
See application file for complete search history.

(56) References Cited

U.S. PATENT DOCUMENTS

| | | | | |
|---|---|---|---|---|
| 2006/0257048 A1* | 11/2006 | Lin | ..................... | G06K 9/00711 382/276 |
| 2008/0193010 A1* | 8/2008 | Eaton | ................. | G06K 9/00771 382/159 |
| 2010/0014781 A1* | 1/2010 | Liu | ..................... | H04N 13/0022 382/285 |

* cited by examiner

*Primary Examiner* — Eueng-Nan Yeh
(74) *Attorney, Agent, or Firm* — N W Poulsen; N Somnath

(57) ABSTRACT

Techniques are disclosed for analyzing a scene depicted in an input stream of video frames captured by a video camera. Bounding boxes are determined for a set foreground patches identified in a video frame. For each bounding box, the techniques include determining textures for first areas, each including a foreground pixel and surrounding pixels, and determining textures for second areas including pixels of the background model image corresponding to the pixels of the foreground areas. Further, for each foreground pixel in the bounding box area, a correlation score is determined based on the texture of the corresponding first area and second area. Pixels whose correlation scores exceed a threshold are removed from the foreground patch. The size of the bounding box may also be reduced to fit the modified foreground patch.

15 Claims, 4 Drawing Sheets

AUTOMATIC GAIN CONTROL FILTER IN A VIDEO ANALYSIS SYSTEM

CROSS-REFERENCE TO RELATED APPLICATIONS

This application is a continuation of U.S. patent application Ser. No. 13/930,222 filed on Jun. 28, 2013, which itself claims priority to U.S. provisional application having Ser. No. 61/666,426, filed on Jun. 29, 2012, both of which are hereby incorporated by reference in their entirety.

BACKGROUND OF THE INVENTION

Field of the Invention

Embodiments of the invention provide techniques for analyzing a sequence of video frames. More particularly, to analyzing and learning behavior based on streaming video data while filtering out automatic gain control effects.

Description of the Related Art

Some currently available video surveillance systems provide simple object recognition capabilities. For example, a video surveillance system may be configured to classify a group of pixels (referred to as a "blob") in a given frame as being a particular object (e.g., a person or vehicle). Once identified, a "blob" may be tracked from frame-to-frame in order to follow the "blob" moving through the scene over time, e.g., a person walking across the field of vision of a video surveillance camera. Further, such systems may be configured to determine when an object has engaged in certain predefined behaviors. For example, the system may include definitions used to recognize the occurrence of a number of pre-defined events, e.g., the system may evaluate the appearance of an object classified as depicting a car (a vehicle-appear event) coming to a stop over a number of frames (a vehicle-stop event).

Automatic gain control (also referred to herein as "autogain") is an adaptive system for adjusting gain based on the magnitude of input, and is often used in electronic cameras to improve the dynamic range of certain images (e.g., images captured in low-lighting conditions). While the images with improved dynamic ranges may look better to human observers, such images may negatively affect a video analysis system. For example, amplification of pixel intensity and/or color drifts may affect the video analysis system's ability to correctly distinguish between pixels of an image associated with foreground objects and background pixels of the image.

In some convention video analysis systems, the autogain feature is simply turned off. Other video analysis systems attempt to correct for autogain by, for example, maintaining color constancy or modeling a specific camera's response during autogain and compensating for the response. These solutions tend to only work for specific cameras (or camera types) and scenes.

SUMMARY OF THE INVENTION

One embodiment of the invention provides a method for analyzing a scene captured by a video camera or other recorded video. The method includes extracting foreground patches from a video frame using a background model image, the foreground patches each including respective foreground pixels. The method also includes, for each foreground pixel: (1) determining a texture of a first area including the foreground pixel and pixels surrounding the foreground pixel and a texture of a second area including pixels of the background model image corresponding to the pixels of the foreground area; and (2) determining a correlation score based on the texture of the first area and the texture of the second area. In addition, the method includes, for foreground pixels whose correlation scores exceed a threshold, removing the foreground pixels from the foreground patches in which the foreground pixels lie.

Other embodiments include a computer-readable medium that includes instructions that enable a processing unit to implement one or more embodiments of the disclosed method as well as a system configured to implement one or more embodiments of the disclosed method.

BRIEF DESCRIPTION OF THE DRAWINGS

So that the manner in which the above recited features, advantages, and objects of the present invention are attained and can be understood in detail, a more particular description of the invention, briefly summarized above, may be had by reference to the embodiments illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENTS

Figure 1:
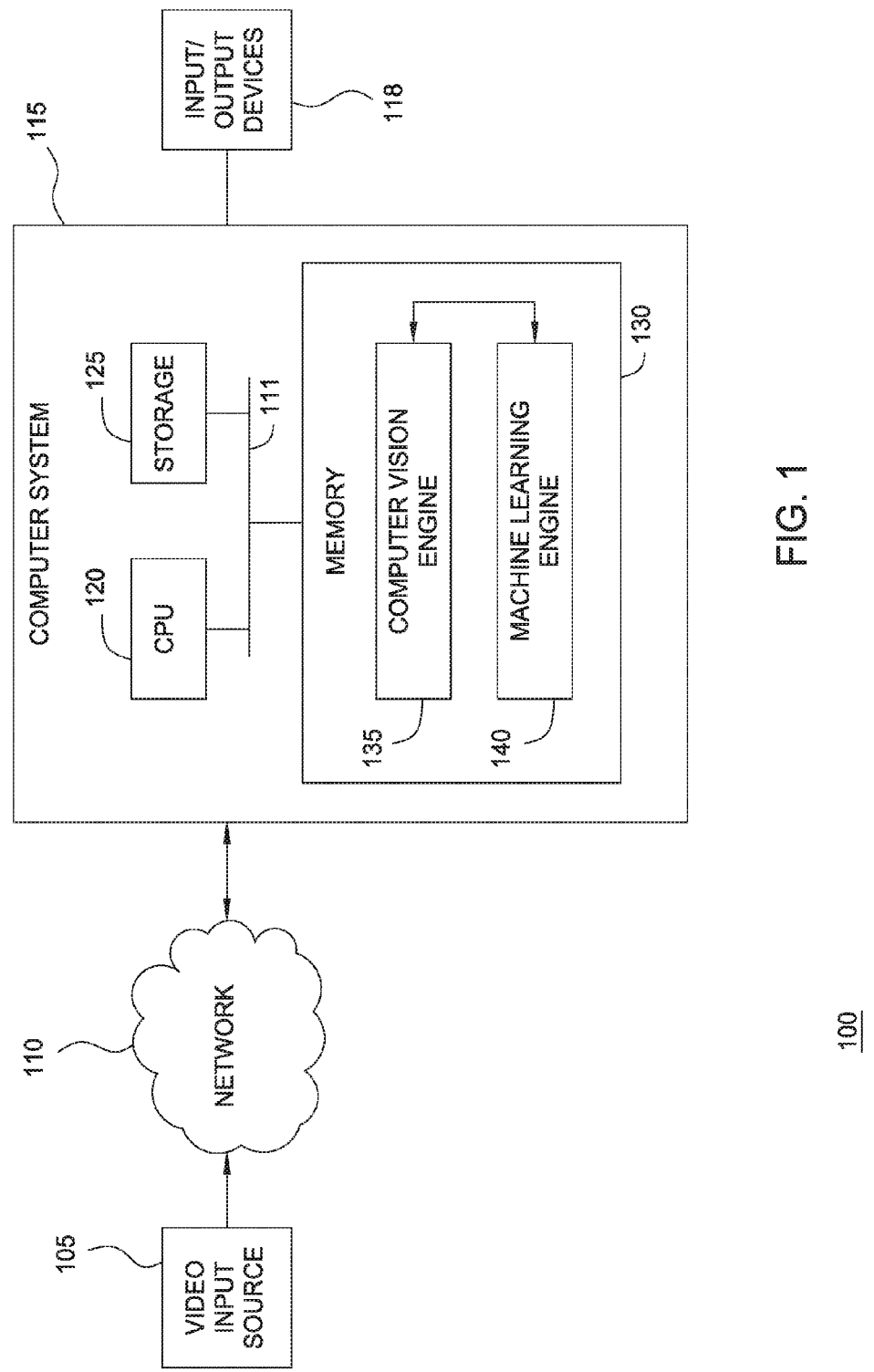
FIG. 1 illustrates components of a video analysis system, according to one embodiment of the invention.

Embodiments of the present invention provide a method and a system for analyzing and learning behavior based on an acquired stream of video frames. A machine-learning video analytics system may be configured to use a computer vision engine to observe a scene, generate information streams of observed activity, and to pass the streams to a machine learning engine. In turn, the machine learning engine may engage in an undirected and unsupervised learning approach to learn patterns regarding the object behaviors in that scene. Thereafter, when unexpected (i.e., abnormal or unusual) behavior is observed, alerts may be generated.

In addition, the computer vision engine may include an autogain filter module configured to filter out (or otherwise adapt to) camera autogain effects that may affect the learning process and other processes. The autogain filter module may be a part of, or distinct from, the BG/FG component, discussed above. In one embodiment, the autogain filter module may receive tracked foreground patches and bounding boxes for those patches. For each foreground pixel in the bounding box area and surrounding pixels of the video frame, and for each corresponding pixel in the background model image, the autogain filter module may determine a texture. As used herein, "texture" refers to local variability of intensity values of pixels. In one embodiment, gradient may be used to compute texture. For example, the autogain filter may apply the Sobel operator, which is commonly used in image processing and edge detection algorithms, to determine gradient values. The Sobel operator provides a discrete differentiation operator, used to compute an approximation of the change of an image intensity function.

In one embodiment, the autogain filter module may determine, for each foreground pixel in the bounding box area, a correlation score based on the texture of the foreground pixel and a set of surrounding pixels in the video frame and texture of corresponding pixels in the background model image. The autogain filter module may remove pixels from the foreground patch which have a correlation score which exceeds a threshold. In addition, the autogain filter module may reduce the size of bounding boxes to fit the modified foreground patch(es).

In the following, reference is made to embodiments of the invention. However, it should be understood that the invention is not limited to any specifically described embodiment. Instead, any combination of the following features and elements, whether related to different embodiments or not, is contemplated to implement and practice the invention. Furthermore, in various embodiments the invention provides numerous advantages over the prior art. However, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

One embodiment of the invention is implemented as a program product for use with a computer system. The program(s) of the program product defines functions of the embodiments (including the methods described herein) and can be contained on a variety of computer-readable storage media. Examples of computer-readable storage media include (i) non-writable storage media (e.g., read-only memory devices within a computer such as CD-ROM or DVD-ROM disks readable by an optical media drive) on which information is permanently stored; (ii) writable storage media (e.g., floppy disks within a diskette drive or hard-disk drive) on which alterable information is stored. Such computer-readable storage media, when carrying computer-readable instructions that direct the functions of the present invention, are embodiments of the present invention. Other examples media include communications media through which information is conveyed to a computer, such as through a computer or telephone network, including wireless communications networks.

In general, the routines executed to implement the embodiments of the invention may be part of an operating system or a specific application, component, program, module, object, or sequence of instructions. The computer program of the present invention is comprised typically of a multitude of instructions that will be translated by the native computer into a machine-readable format and hence executable instructions. Also, programs are comprised of variables and data structures that either reside locally to the program or are found in memory or on storage devices. In addition, various programs described herein may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

FIG. 1 illustrates components of a video analysis and behavior-recognition system 100, according to one embodiment of the present invention. As shown, the behavior-recognition system 100 includes a video input source 105, a network 110, a computer system 115, and input and output devices 118 (e.g., a monitor, a keyboard, a mouse, a printer, and the like). The network 110 may transmit video data recorded by the video input 105 to the computer system 115. Illustratively, the computer system 115 includes a CPU 120, storage 125 (e.g., a disk drive, optical disk drive, floppy disk drive, and the like), and a memory 130 which includes both a computer vision engine 135 and a machine-learning engine 140. As described in greater detail below, the computer vision engine 135 and the machine-learning engine 140 may provide software applications configured to analyze a sequence of video frames provided by the video input 105.

Network 110 receives video data (e.g., video stream(s), video images, or the like) from the video input source 105. The video input source 105 may be a video camera, a VCR, DVR, DVD, computer, web-cam device, or the like. For example, the video input source 105 may be a stationary video camera aimed at a certain area (e.g., a subway station, a parking lot, a building entry/exit, etc.), which records the events taking place therein. Generally, the area visible to the camera is referred to as the "scene." The video input source 105 may be configured to record the scene as a sequence of individual video frames at a specified frame-rate (e.g., 24 frames per second), where each frame includes a fixed number of pixels (e.g., 320×240). Each pixel of each frame may specify a color value (e.g., an RGB value) or grayscale value (e.g., a radiance value between 0-255). Further, the video stream may be formatted using known formats including MPEG2, MJPEG, MPEG4, H.263, H.264, and the like.

As noted above, the computer vision engine 135 may be configured to analyze this raw information to identify active objects in the video stream, identify a variety of appearance and kinematic features used by a machine learning engine 140 to derive object classifications, derive a variety of metadata regarding the actions and interactions of such objects, and supply this information to the machine-learning engine 140. And in turn, the machine-learning engine 140 may be configured to evaluate, observe, learn and remember details regarding events (and types of events) that transpire within the scene over time.

In one embodiment, the machine-learning engine 140 receives the video frames and the data generated by the computer vision engine 135. The machine-learning engine 140 may be configured to analyze the received data, cluster objects having similar visual and/or kinematic features, build semantic representations of events depicted in the video frames. Over time, the machine learning engine 140 learns expected patterns of behavior for objects that map to a given cluster. Thus, over time, the machine learning engine learns from these observed patterns to identify normal and/or abnormal events. That is, rather than having patterns, objects, object types, or activities defined in advance, the machine learning engine 140 builds its own model of what different object types have been observed (e.g., based on clusters of kinematic and or appearance features) as well as a model of expected behavior for a given object type. In particular, the machine learning engine may model the kinematic properties of one or more types of objects.

In general, the computer vision engine 135 and the machine-learning engine 140 both process video data in real-time. However, time scales for processing information by the computer vision engine 135 and the machine-learning engine 140 may differ. For example, in one embodiment, the computer vision engine 135 processes the received video data frame-by-frame, while the machine-learning engine 140 processes data every N-frames. In other words, while the computer vision engine 135 may analyze each frame in real-time to derive a set of appearance and kinematic data related to objects observed in the frame, the machine-learning engine 140 is not constrained by the real-time frame rate of the video input.

Note, however, FIG. 1 illustrates merely one possible arrangement of the behavior-recognition system 100. For example, although the video input source 105 is shown connected to the computer system 115 via the network 110, the network 110 is not always present or needed (e.g., the video input source 105 may be directly connected to the computer system 115). Further, various components and modules of the behavior-recognition system 100 may be implemented in other systems. For example, in one embodiment, the computer vision engine 135 may be implemented as a part of a video input device (e.g., as a firmware component wired directly into a video camera). In such a case, the output of the video camera may be provided to the machine-learning engine 140 for analysis. Similarly, the output from the computer vision engine 135 and machine-learning engine 140 may be supplied over computer network 110 to other computer systems. For example, the computer vision engine 135 and machine-learning engine 140 may be installed on a server system and configured to process video from multiple input sources (i.e., from multiple cameras). In such a case, a client application 250 running on another computer system may request (or receive) the results of over network 110.

Figure 2:
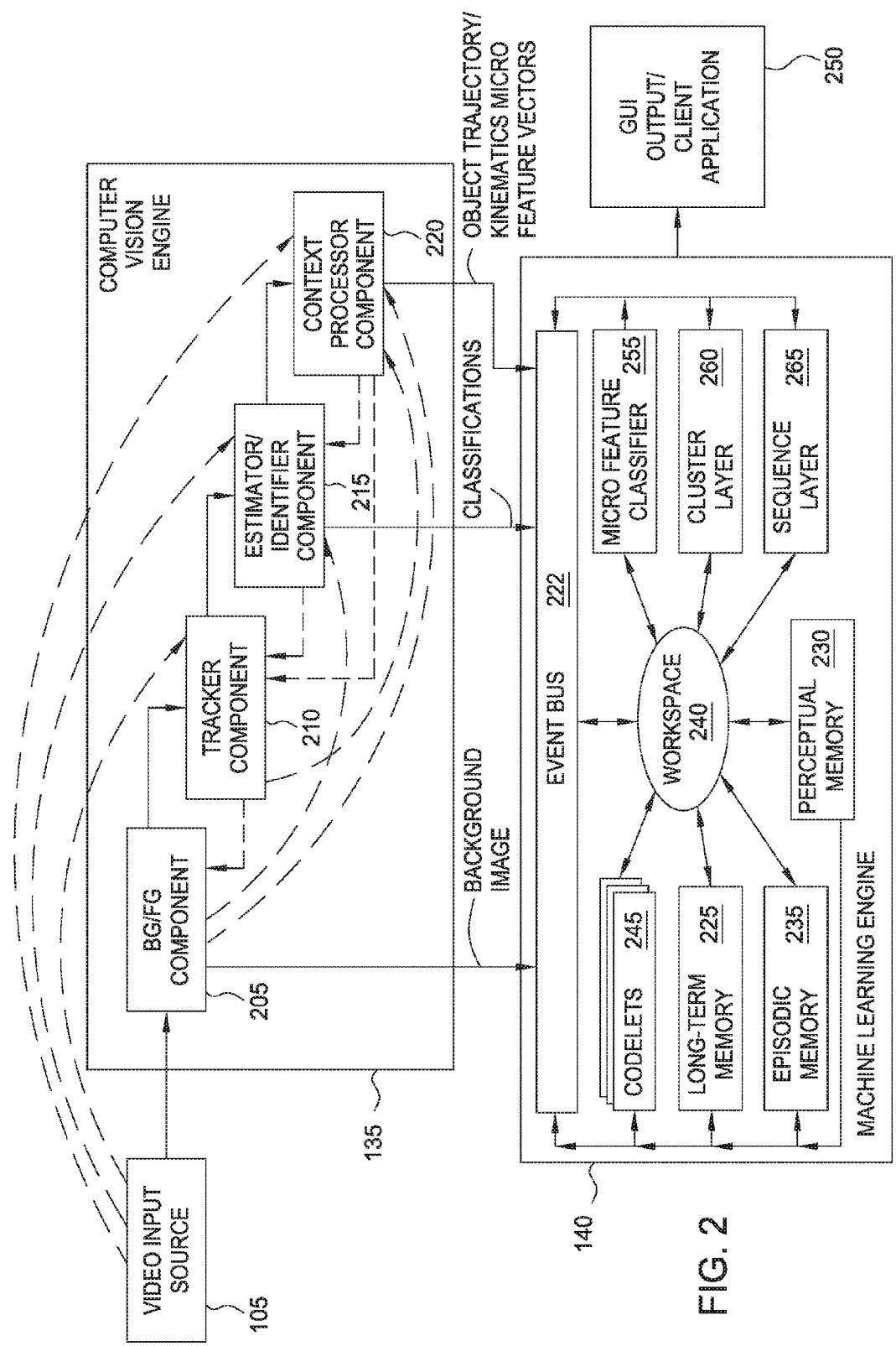
FIG. 2 further illustrates components of the video analysis system shown in FIG. 1, according to one embodiment of the invention.

FIG. 2 further illustrates components of the computer vision engine 135 and the machine-learning engine 140 first illustrated in FIG. 1, according to one embodiment of the invention. As shown, the computer vision engine 135 includes a background/foreground (BG/FG) component 205, a tracker component 210, an estimator/identifier component 215, and a context processor component 220. Collectively, the components 205, 210, 215, and 220 provide a pipeline for processing an incoming sequence of video frames supplied by the video input source 105 (indicated by the solid arrows linking the components). Additionally, the output of one component may be provided to multiple stages of the component pipeline (as indicated by the dashed arrows) as well as to the machine-learning engine 140. In one embodiment, the components 205, 210, 215, and 220 may each provide a software module configured to provide the functions described herein. Of course one of ordinary skill in the art will recognize that the components 205, 210, 215, and 220 may be combined (or further subdivided) to suit the needs of a particular case and further that additional components may be added (or some may be removed).

In one embodiment, the BG/FG component 205 may be configured to separate each frame of video provided by the video input source 105 into a static part (the scene background) and a collection of volatile parts (the scene foreground.) The frame itself may include a two-dimensional array of pixel values for multiple channels (e.g., RGB channels for color video or grayscale channel or radiance channel for black and white video). In one embodiment, the BG/FG component 205 may model background states for each pixel using an adaptive resonance theory (ART) network. That is, each pixel may be classified as depicting scene foreground or scene background using an ART network modeling a given pixel. Of course, other approaches to distinguish between scene foreground and background may be used.

Additionally, the BG/FG component 205 may be configured to generate a mask used to identify which pixels of the scene are classified as depicting foreground and, conversely, which pixels are classified as depicting scene background. The BG/FG component 205 then identifies regions of the scene that contain a portion of scene foreground (referred to as a foreground "blob" or "patch") and supplies this information to subsequent stages of the pipeline. Additionally, pixels classified as depicting scene background maybe used to generate a background model image modeling the scene.

The tracker component 210 may receive the foreground patches produced by the BG/FG component 205 and generate computational models for the patches. The tracker component 210 may be configured to use this information, and each successive frame of raw-video, to attempt to track the motion of an object depicted by a given foreground patch as it moves about the scene. That is, the tracker component 210 provides continuity to other elements of the system by tracking a given object from frame-to-frame.

The estimator/identifier component 215 may receive the output of the tracker component 210 (and the BF/FG component 205) and identify a variety of kinematic and/or appearance features of a foreground object, e.g., size, height, width, and area (in pixels), reflectivity, shininess rigidity, speed velocity, etc.

The context processor component 220 may receive the output from other stages of the pipeline (i.e., the tracked objects, the background and foreground models, and the results of the estimator/identifier component 215). Using this information, the context processor 220 may be configured to generate a stream of context events regarding objects tracked (by tracker component 210) and evaluated (by estimator identifier component 215). For example, the context processor component 220 may package a stream of micro-feature vectors and kinematic observations of an object and output this to the machine-learning engine 140, e.g., at a rate of 5 Hz. In one embodiment, the context events are packaged as a trajectory. As used herein, a trajectory generally refers to a vector packaging the kinematic data of a particular foreground object in successive frames or samples. Each element in the trajectory represents the kinematic data captured for that object at a particular point in time. Typically, a complete trajectory includes the kinematic data obtained when an object is first observed in a frame of video along with each successive observation of that object up to when it leaves the scene (or becomes stationary to the point of dissolving into the frame background). Accordingly, assuming computer vision engine 135 is operating at a rate of 5 Hz, a trajectory for an object is updated every 200 milliseconds, until complete.

The computer vision engine 135 may take the output from the components 205, 210, 215, and 220 describing the motions and actions of the tracked objects in the scene and supply this information to the machine-learning engine 140. Illustratively, the machine-learning engine 140 includes a long-term memory 225, a perceptual memory 230, an episodic memory 235, a workspace 240, codelets 245, a micro-feature classifier 255, a cluster layer 260 and a sequence layer 265. Additionally, the machine-learning engine 140 includes a client application 250, allowing the user to interact with the video surveillance system 100 using a graphical user interface. Further still, the machine-learning engine 140 includes an event bus 222. In one embodiment, the components of the computer vision engine 135 and machine-learning engine 140 output data to the event bus 222. At the same time, the components of the machine-learning engine 140 may also subscribe to receive different event streams from the event bus 222. For example, the micro-feature classifier 255 may subscribe to receive the micro-feature vectors output from the computer vision engine 135.

Generally, the workspace 240 provides a computational engine for the machine-learning engine 140. For example, the workspace 240 may be configured to copy information from the perceptual memory 230, retrieve relevant memories from the episodic memory 235 and the long-term memory 225, select which codelets 245 to execute. Each codelet 245 may be a software program configured to evaluate different sequences of events and to determine how one sequence may follow (or otherwise relate to) another (e.g., a finite state machine). More generally, each codelet may provide a software module configured to detect interesting patterns from the streams of data fed to the machine-learning engine. In turn, the codelet 245 may create, retrieve, reinforce, or modify memories in the episodic memory 235 and the long-term memory 225. By repeatedly scheduling codelets 245 for execution, copying memories and percepts to/from the workspace 240, the machine-learning engine 140 performs a cognitive cycle used to observe, and learn, about patterns of behavior that occur within the scene.

In one embodiment, the perceptual memory 230, the episodic memory 235, and the long-term memory 225 are used to identify patterns of behavior, evaluate events that transpire in the scene, and encode and store observations. Generally, the perceptual memory 230 receives the output of the computer vision engine 135 (e.g., the context event stream). The episodic memory 235 stores data representing observed events with details related to a particular episode, e.g., information describing time and space details related to an event. That is, the episodic memory 235 may encode specific details of a particular event, i.e., "what and where" something occurred within a scene, such as a particular vehicle (car A) moved to a location believed to be a parking space (parking space 5) at 9:43 AM.

In contrast, the long-term memory 225 may store data generalizing events observed in the scene. To continue with the example of a vehicle parking, the long-term memory 225 may encode information capturing observations and generalizations learned by an analysis of the behavior of objects in the scene such as "vehicles in certain areas of the scene tend to be in motion," "vehicles tend to stop in certain areas of the scene," etc. Thus, the long-term memory 225 stores observations about what happens within a scene with much of the particular episodic details stripped away. In this way, when a new event occurs, memories from the episodic memory 235 and the long-term memory 225 may be used to relate and understand a current event, i.e., the new event may be compared with past experience, leading to both reinforcement, decay, and adjustments to the information stored in the long-term memory 225, over time. In a particular embodiment, the long-term memory 225 may be implemented as an ART network and a sparse-distributed memory data structure.

The micro-feature classifier 255 may schedule a codelet 245 to evaluate the micro-feature vectors output by the computer vision engine 135. As noted, the computer vision engine 135 may track objects frame-to-frame and generate micro-feature vectors for each foreground object at a rate of, e.g., 5 Hz. In one embodiment, the micro-feature classifier 255 may be configured to create clusters from this stream of micro-feature vectors. For example, each micro-feature vector may be supplied to an input layer of the ART network (or a combination of a self organizing map (SOM) and ART network used to cluster nodes in the SOM). In response, the ART network maps the micro-feature vector to a cluster in the ART network and updates that cluster (or creates a new cluster if the input micro-feature vector is sufficiently dissimilar to the existing clusters). Each cluster is presumed to represent a distinct object type, and objects sharing similar micro-feature vectors (as determined using the choice and vigilance parameters of the ART network) may map to the same cluster.

For example, the micro-features associated with observations of many different vehicles may be similar enough to map to the same cluster (or group of clusters). At the same time, observations of many different people may map to a different cluster (or group of clusters) than the vehicles cluster. Thus, each distinct cluster in the art network generally represents a distinct type of object acting within the scene. And as new objects enter the scene, new object types may emerge in the ART network.

Importantly, however, this approach does not require the different object type classifications to be defined in advance; instead, object types emerge over time as distinct clusters in the ART network. In one embodiment, the micro-feature classifier 255 may assign an object type identifier to each cluster, providing a different object type for each cluster in the ART network.

In an alternative embodiment, rather than generate clusters from the micro-features vector directly, the micro-feature classifier 255 may supply the micro-feature vectors to a self-organizing map structure (SOM). In such a case, the ART network may cluster nodes of the SOM—and assign an object type identifier to each cluster. In such a case, each SOM node mapping to the same cluster is presumed to represent an instance of a common type of object.

As shown, the machine-learning engine 140 also includes a cluster layer 260 and a sequence layer 265. As described in greater detail below, the cluster layer 260 may be configured to generate clusters from the trajectories of objects classified by the micro-feature classifier 255 as being an instance of a common object type. In one embodiment, the cluster layer 260 uses a combination of a self-organizing map (SOM) and an ART network to cluster the kinematic data in the trajectories. Once the trajectories are clustered, the sequence layer 265 may be configured to generate sequences encoding the observed patterns of behavior represented by the trajectories. And once generated, the sequence layer may identify segments within a sequence using a voting experts technique. Further, the sequence layer 265 may be configured to identify anomalous segments and sequences.

In addition to the learning process discussed above, embodiments may be configured to filter out camera auto-gain effects which may affect the learning process and other processes, as discussed in greater detail below.

Filtering Autogain Effects in a Machine-Learning Video Analytics System

As noted above, a machine-learning video analytics system may be configured to use a computer vision engine to observe a scene, generate information streams of observed activity, and to pass the streams to a machine learning engine. In turn, the machine learning engine may engage in an undirected and unsupervised learning approach to learn patterns regarding the object behaviors in that scene. Thereafter, when unexpected (i.e., abnormal or unusual) behavior is observed, alerts may be generated.

In addition, the computer vision engine may include an autogain filter module configured to filter out (or otherwise adapt to) camera autogain effects that may affect the learning process and other processes. The autogain filter module may be a part of, or distinct from, the BG/FG component, discussed above. In one embodiment, the autogain filter module may receive tracked foreground patches and bounding boxes for those patches. For each foreground pixel in the bounding box area and surrounding pixels of the video frame, and for each corresponding pixel in the background model image, the autogain filter module may determine a texture. As used herein, "texture" refers to local variability of intensity values of pixels. In one embodiment, gradient may be used to compute texture. For example, the autogain filter may apply the Sobel operator, which is commonly used in image processing and edge detection algorithms, to determine gradient values. The Sobel operator provides a discrete differentiation operator, used to compute an approximation of the change of an image intensity function.

In one embodiment, the autogain filter module may determine, for each foreground pixel in the bounding box area, a correlation score based on the texture of the foreground pixel and a set of surrounding pixels in the video frame and texture of corresponding pixels in the background model image. The autogain filter module may remove pixels from the foreground patch which have a correlation score which exceeds a threshold. In addition, the autogain filter module may reduce the size of bounding boxes to fit the modified foreground patch(es).

Figure 3:
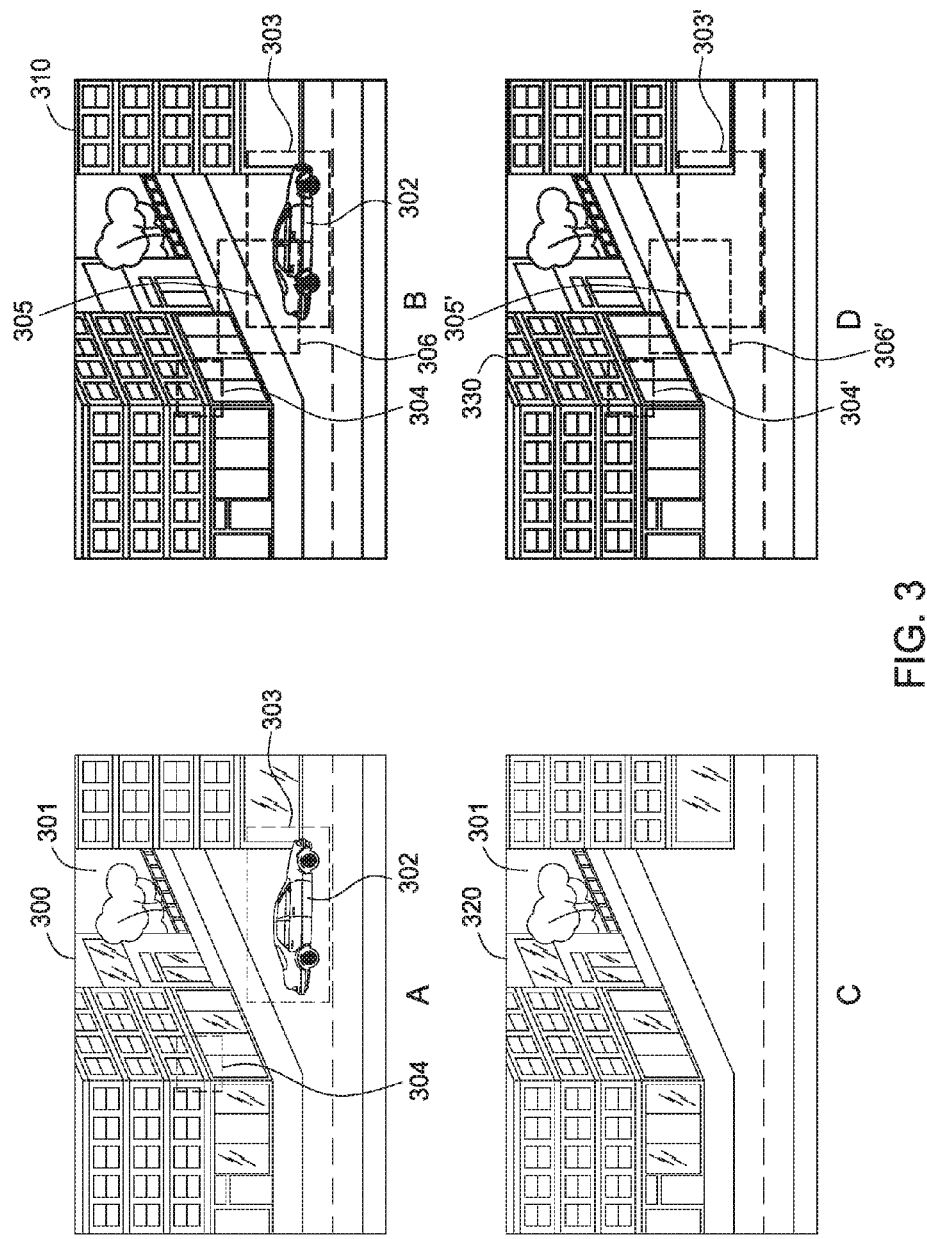
FIG. 3 illustrates an example video frame and background model image and corresponding gradient images, according to one embodiment of the invention.

FIG. 3 illustrates an example video frame and background model image and corresponding gradient images, according to one embodiment of the invention. Panel A depicts the example video frame 300, which may be one frame from a sequence of video frames. As shown, the video frame 300 depicts a scene which includes buildings and trees 301 in the background and a vehicle 302 in the foreground. As discussed, a BG/FG component of the computer vision engine may separate the video frame 300 into a static scene background (e.g., the buildings and trees 301) and a volatile scene foreground (e.g., the vehicle 302) based on a learned background model. Illustratively, the foreground vehicle 302 is further tracked by the computer vision engine using a bounding box 303. Ideally, the bounding box 303 may have width and height equal to the width and height of the vehicle 302 itself so as to track the pixels representing the vehicle 302. However, as shown, the bounding box is larger than the vehicle 302. Such an enlarged bounding box may result from camera autogain. For example, the effects of autogain may include amplified intensity and/or color drift of certain background pixels. When the BG/FG component compares such background pixels to pixels of the background model image, the pixels may differ sufficiently to be identified as foreground pixels. Such false-positive foreground pixels may then be tracked together with pixels of an actual foreground object, as illustrated by bounding box 303 tracking background pixels with pixels of the vehicle 302. Alternatively, such false-positive foreground pixels may simply be tracked by themselves as distinct foreground object(s), as illustrated by bounding box 304 tracking pixels of a background building.

Panel B depicts a gradient image 310 corresponding to the video frame 300. As shown, the gradient image 310 includes pixels which indicate gradient values at corresponding pixels of the video frame 300. In one embodiment, the autogain filter module may apply the Sobel operator to the video frame 300 to obtain the gradient image 310. As a result of the Sobel operator, pixels of the gradient image 310 having high gradient values, which are likely to be edges, are differentiated (e.g., by radiance value in the gradient image 301) from pixels having low gradient values, which are unlikely to be edges. In alternative embodiments, other edge-detection techniques (e.g., Haar wavelet transform) may be applied in lieu of the Sobel operator to create a gradient image or similar data. In yet another embodiment, the edge detection technique (e.g., Sobel operator, Haar wavelet transform, etc.) may be applied for only foreground pixels in the bounding boxes 303, 304 and surrounding pixels, as discussed in greater detail below, rather than for the entire video frame 300, as illustrated in Panel B. That is, the gradient image would include values for only foreground pixels in the bounding boxes 303, 304 and surrounding pixels, rather than for all pixels of the video frame.

Panel B further shows a pixel 305 of the gradient image within the bounding box 303 and pixels 306 which surround the pixel 305. Illustratively, the pixels 306 which surround the pixel 305 are bounded by a square (shown as dashed lines) having the pixel 305 as its center. In practice, the square may have length and width of a few pixels (e.g., 3 pixels). Gradient values of the pixels 305 and surrounding pixels 306 may be compared with the gradient values of corresponding pixels in a gradient image for a background model image to determine a correlation value for the pixel 305, as discussed in greater detail below.

Panels C and D depict the background model image 320 and its gradient image 330. As discussed, the background model image 320 includes static parts (e.g., the buildings and trees 301) of the image 300, which may be learned by the BG/FG component over time. As shown in Panel D, bounding boxes 303', 304' correspond to bounding boxes 303, 304, respectively, of the video frame 300 and its gradient image 310. As discussed, the autogain filter module may apply an edge detection technique such as the Sobel operator to obtain the gradient image 310. In one embodiment, the edge detection technique may be applied for only pixels of the background model image 320 corresponding to foreground pixels in the bounding boxes 303, 304 and surrounding pixels, rather than for the entire background model image 320, as illustrated in Panel B. That is, the gradient image would include values for only pixels corresponding to foreground pixels in the bounding boxes 303', 304' and surrounding pixels, rather than for all pixels of the background model image.

Pixel 305' and surrounding pixels 306' correspond to pixel 305 and surrounding pixels 306 of the gradient image 310 for the video frame 300, and these corresponding pixels may be compared to determine a correlation value for the pixel 305. Based on the correlation value, the autogain filter module may determine whether to keep the pixel as part of the foreground patch, and whether to resize the bounding box 303 if the pixel is removed from the foreground patch, as discussed in greater detail below.

Figure 4:
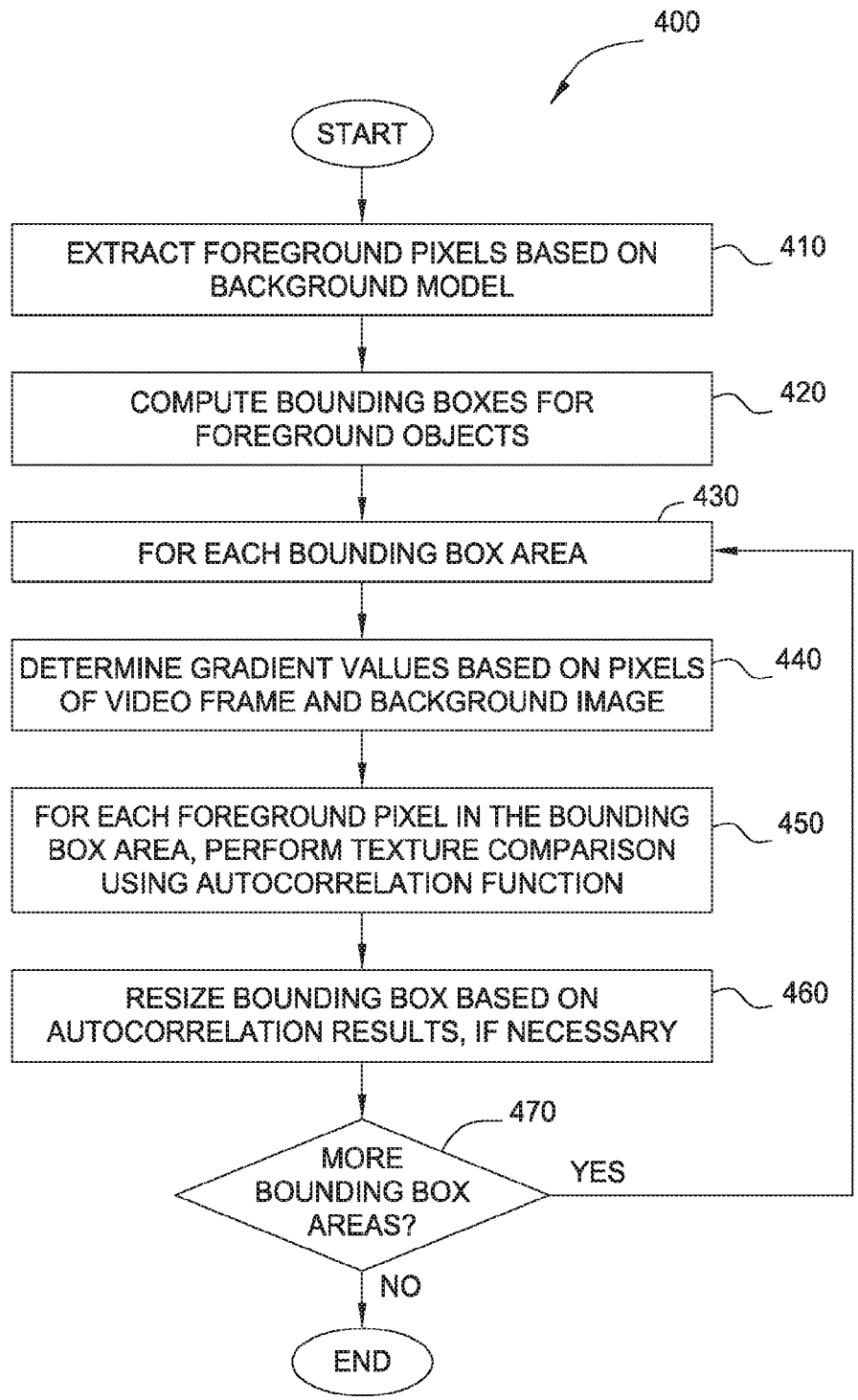
FIG. 4 illustrates a method for filtering out false-positive foreground pixels resulting from camera autogain, according to one embodiment of the invention.

FIG. 4 illustrates a method for filtering out false-positive foreground pixels resulting from camera autogain, according to one embodiment of the invention. As shown, the method 400 begins at step 410, where a BG/FG component of a computer vision engine extracts foreground pixels of a video frame based on a background model. At step 420, the BG/FG component computes bounding boxes for foreground objects (i.e., patches of foreground pixels). As discussed, each bounding box may have width and height equal to the maximum width and height of the corresponding foreground object.

At step 430, the autogain filter module loops over each bounding box. For each bounding box, the autogain filter module determines gradient values from the video frame and the background model image at step 440. Note, gradient is one of a number of techniques for computing texture (i.e., local variability of intensity values of pixels) in an image, and other techniques for computing texture may be used in lieu of gradient.

In one embodiment, the autogain filter module may calculate gradient values for each of the foreground pixels in the bounding box of the video frame, as well as corresponding pixels in the background model image. The autogain filter module may further calculate gradient values for video frame and background pixels in areas surrounding the foreground pixels (e.g., squares having the foreground pixels as their centers) in the video frame and corresponding areas in the background model image, respectively. Note, such surrounding pixels may sometimes lie outside the aforementioned bounding box(es).

In one embodiment, the autogain filter module may apply the Sobel operator to the foreground pixels in the bounding box areas and surrounding pixels and to corresponding pixels of the background model image to generate the gradient images discussed above. Use of the Sobel operator is advantageous because it indicates first-degree edges and therefore tends to not, for example, include one-pixel signal noise in the gradient image. In alternative embodiments, Haar wavelet transform and other edge-detection techniques may be used in lieu of the Sobel operator. In particular, edge-detection techniques resilient to noise and invariant (or less sensitive) to illumination and/or color/hue changes may be used.

In another embodiment, the foreground and background pixels used by the autogain filter module may be in grayscale. For example, before the autogain filter module applies the Sobel operator to the foreground pixels in the bounding box areas and surrounding pixels and to corresponding pixels of the background model image, the autogain filter module may first convert such foreground and background pixels to grayscale, if necessary.

At step 450, the autogain filter module further loops over each foreground pixel in the bounding box area and performs a texture comparison using a correlation function. Correlation functions are well-known function and may be used to provide a texture match score for a given foreground pixel based on, e.g., the gradient values of that pixel and its surrounding pixels in the video frame and the gradient values of corresponding pixels in the background model image. That is, the texture match score may indicate a degree of identity (e.g., a percentage match) between the texture (e.g., in terms of gradient) of the area including the foreground pixel and its surrounding pixels and corresponding pixels of the background model image.

At step 460, the autogain filter module resizes the bounding box based on the correlation results of step 450, if necessary. As discussed, the correlation function may be configured to return a score indicating a degree of match between the texture around a pixel in the background model gradient image and the video frame gradient image. If the correlation score is high (or low, depending on the implementation), it may indicate that a foreground patch pixel is actually part of the background (i.e., that the pixel is a false-positive foreground pixel). As a result, the autogain filter module may be configured to, for example, remove pixels from the foreground patch where the correlation score for those pixels exceeds (or is less than) a threshold. The bounding box for the foreground patch may then be adjusted accordingly to have width and height equal to the maximum width and maximum height, respectively, of the modified foreground patch.

In one embodiment, the threshold correlation score and number of surrounding pixels may be adjusted based on the size of the bounding box, with a higher identity match (e.g., a higher threshold score) required and more surrounding pixels used for larger bounding boxes, and vice versa. For example, the threshold correlation score may be made to require a closer (or less close) identity, and the size of square(s) including surrounding pixels may be made larger, based on the size of the bounding box according to discrete step functions. In general, larger bounding boxes may indicate global autogain effects. By contrast, smaller bounding boxes are less likely to result from autogain effects. The threshold correlation score and number of surrounding pixels may be adjusted to account for these tendencies because, for example, using a higher identity match and large number of surrounding pixels may cause the mischaracterization of actual foreground pixels in small bounding boxes as background pixels.

At step 470, the autogain filter module determines whether there are more bounding box areas and returns to step 430 if there are more bounding box areas. If there are no additional bounding box areas, the method 400 ends.

Although discussed above with respect to autogain, techniques similar to those discussed may also be applied generally to help distinguish foreground from background. For example, techniques similar to those discussed may be used to filter out effects of auto white balancing; signal noise; and instances where the camera does not over-filter, a common problem with shadow, noise, etc. algorithms. Although discussed above with respect to reducing the size of a foreground object bounding box, techniques similar to those discussed may also be used to, for example, prevent background model corruption due to incorrect pixels being identified as background pixels.

While the foregoing is directed to embodiments of the present invention, other and further embodiments of the invention may be devised without departing from the basic scope thereof.

What is claimed is:

1. A computer-implemented method comprising:
    computing at least one bounding box for one or more foreground objects in a video frame;
    for each bounding box:
        determining a texture of a first area including pixels for the one or more foreground objects and pixels surrounding the pixels for the one or more foreground objects and a texture of a second area including pixels of a background model image for the video frame corresponding to pixels of the first area,
        determining a correlation score based on the texture of the first area and the texture of the second area, and
        resizing the bounding box based on the correlation score and a threshold value, the threshold value being proportional to a size of the bounding box; and
    outputting the video frame with the resized at least one bounding box for behavior analysis of the one or more foreground objects.

2. The method of claim 1, wherein determining texture of the first area of an associated bounding box includes determining gradient values for the pixels for the one or more foreground objects and the pixels surrounding the pixels for the one or more foreground objects, and wherein determining texture of the second area includes determining gradient values for the pixels of the background model image corresponding to the pixels of the first area.

3. The method of claim 2, wherein the gradient values are determined using an edge detection technique which is resilient to noise and invariant to illumination and/or color/hue changes.

4. The method of claim 2, wherein the gradient values are determined by applying one of a Sobel Operator and a Haar wavelet transform.

5. The method of claim 1, wherein the number of surrounding pixels used in the first area is proportional to the size of the associated bounding box.

6. The method of claim 1, further comprising, removing the pixels for the one or more foreground objects from the first area of the associated bounding box when the correlation score exceeds the threshold value.

7. The method of claim 1, further comprising, prior to determining the textures, converting the pixels in the first area and the second area of the associated bounding box to grayscale.

8. A non-transitory computer-readable storage medium storing computer-executable instructions, which when executed by a computer system, perform operations, the computer-executable instructions comprising instructions to:
compute at least one bounding box for foreground objects in a video frame;
for the at least one bounding box:
determine a texture of a first area including pixels for the foreground objects and pixels surrounding the pixels for the foreground objects and a texture of a second area including pixels of a background model image for the video frame corresponding to pixels of the first area, and
determine a correlation score based on the texture of the first area and the texture of the second area; and
resize the at least one bounding box based on the correlation score and a threshold value, the threshold value being proportional to a size of the at least one bounding box; and
output the video frame with the resized at least one bounding box to analyze behavior of the foreground objects.

9. The non-transitory computer-readable storage medium of claim 8, wherein the computer-executable instructions to determine texture of the first area include instructions to determine gradient values for the pixels for the foreground objects and the pixels surrounding the pixels for the foreground objects, and wherein the computer-executable instructions to determine texture of the second area includes instructions to determine gradient values for the pixels of the background model image corresponding to the first area.

10. The non-transitory computer-readable storage medium of claim 9, wherein the instructions to determine gradient values include instructions for an edge detection technique that is resilient to noise and invariant to illumination and/or color/hue changes.

11. The non-transitory computer-readable storage medium of claim 9, wherein the instructions to determine gradient values include instructions for application of at least one of a Sobel Operator and a Haar wavelet transform.

12. The non-transitory computer-readable storage medium of claim 8, wherein the number of surrounding pixels used in the first area is proportional to the size of the at least one bounding box.

13. The non-transitory computer-readable storage medium of claim 8, wherein the computer-executable instructions further comprises instructions to remove the pixels for the foreground objects from the first area when the correlation score exceeds the threshold value.

14. The non-transitory computer-readable storage medium of claim 8, the computer-executable instructions further comprising instructions to, prior to determining the textures, convert the pixels in the first area and the second area to grayscale.

15. A system, comprising:
at least one processor; and
a memory in communication with the at least one processor, wherein the memory includes one or more application programs configured to perform operations, the one or more application programs comprising instructions for the at least one processor to:
compute at least one bounding box for one or more foreground objects in a video frame;
for each bounding box:
determine a texture of a first area including pixels for the one or more foreground objects and pixels surrounding the pixels for the one or more foreground objects and a texture of a second area including pixels of a background model image for the video frame corresponding to pixels of the first area,
determine a correlation score based on the texture of the first area and the texture of the second area, and
resize the bounding box based on the correlation score and a threshold value, the threshold value being proportional to a size of the at least one bounding box; and
output the video frame with the resized at least one bounding box for behavior analysis of the one or more foreground objects.

* * * * *